(No Model.)
J. A. WHITSON.
ANCHOR FOR CHECK ROW PLANTERS.
No. 526,424. Patented Sept. 25, 1894.
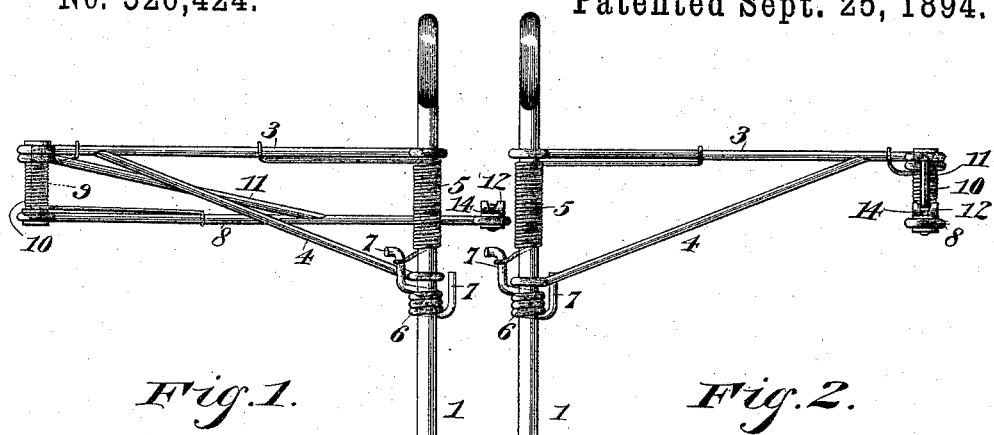
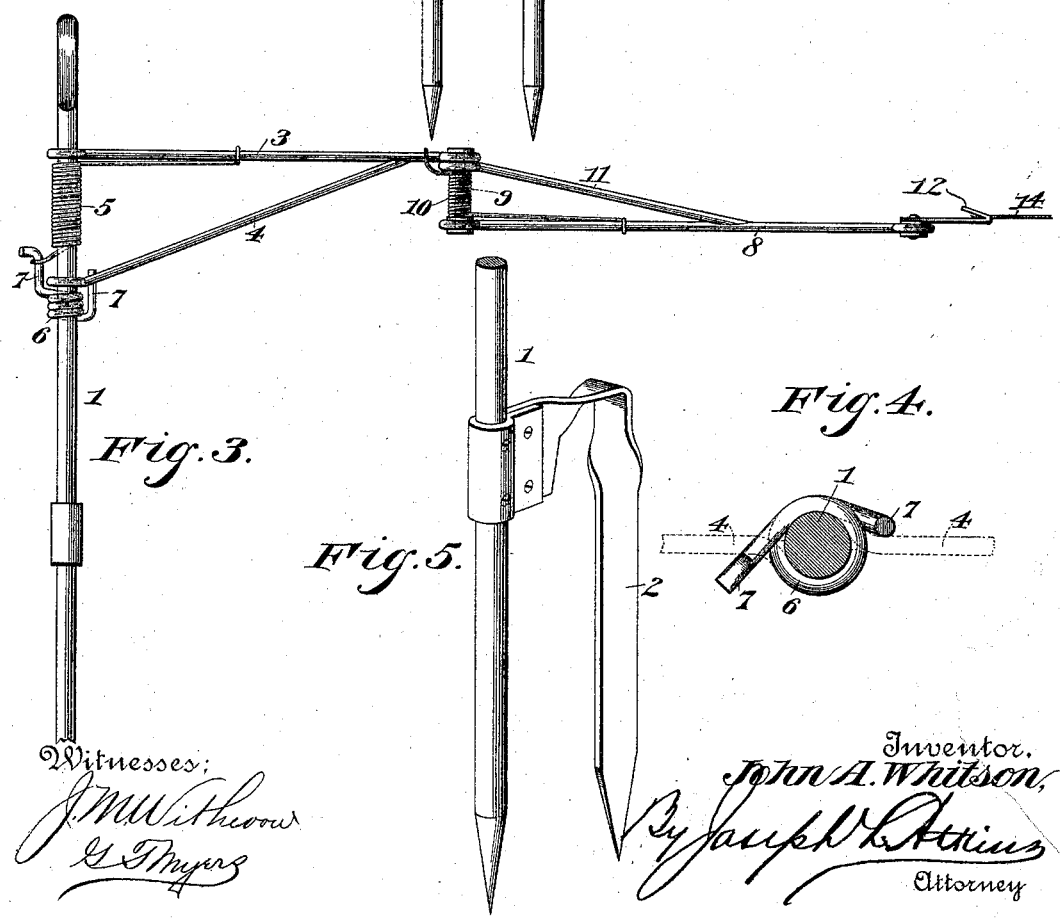

UNITED STATES PATENT OFFICE.

JOHN ALBERT WHITSON, OF NEW FRANKLIN, MISSOURI.

ANCHOR FOR CHECK-ROW PLANTERS.

SPECIFICATION forming part of Letters Patent No. 526,424, dated September 25, 1894.

Application filed December 19, 1893. Serial No. 494,022. (No model.)

*To all whom it may concern:*

Be it known that I, JOHN ALBERT WHITSON, of New Franklin, county of Howard, State of Missouri, have invented certain new and useful Improvements in Check-Row-Planter Anchors, of which the following is a specification, reference being had to the accompanying drawings.

The object of my invention is to produce an improved anchor for check row planters by which a more even tension upon the row line may be preserved, than by those now in use.

In the accompanying drawings: Figure 1 is a side elevation of my anchor in position for giving tension to the row line in going from the anchor. Fig. 2 is a similar view in going toward the anchor. Fig. 3 is a similar view with the arms extended in order to show the construction. Fig. 4 is a detail view showing the means for locking the main arm on one side of the anchor. Fig. 5 is a detail view of the lower end of the anchor.

Referring to the figures on the drawings: 1 indicates a stake piece and 2 the foot piece secured thereto and projecting at a short distance therefrom parallel with the lower end of the stake. Both the stake piece and foot piece are sharpened so that they may be readily driven in the ground, for example, by pressure of a foot upon the foot piece; and serve, when inserted in the ground, to hold the stake irrevolubly fixed therein.

3 indicates a main arm pivotally secured to the upper part of the stake and susceptible of a slight longitudinal motion thereon.

4 indicates a brace arm pivoted, in like manner, to the upper part of the stake and secured to the outer end of the arm to afford a support for it.

5 indicates a spring, preferably coiled around the stake piece. Being fixedly secured at one end to the stake and at the other end to the arm, it tends to cause the arm to rotate upon the stake. The degree of rotation of the arm is limited by a double stop piece 6 which may consist of a wire coiled up and fixed to the stake in proximity to the brace arm and having projecting ends 7 in the path thereof. One of the ends 7 extends up a sufficient distance to catch the brace arm at all times, while the other is lower, and serves only to catch the brace arm when it has been lifted over and depressed behind it, as shown in Fig. 4 of the drawings.

8 indicates a grasp arm pivoted to the end of the main arm, as upon a pin 9 which is preferably made of a sufficient length to conveniently accommodate a coiled spring 10 which is secured at one end to the main arm and at the other end to the grasp arm so as to impart to the latter a tendency to rotary motion when it is turned in opposition to the force of the spring.

In practice, the spring 10 preferably exerts its power in an opposite direction to the spring 5. The grasp arm may also be provided with a brace 11, as preferred, to lend greater rigidity to it. At the end of the grasp arm a grasp hook 12 is swiveled.

14 indicates a row line adapted to be fastened at one end to the grasp hook and be operated in the well-known manner in connection with a planter, not illustrated.

It will be sufficient for the purpose of explanation to indicate that in Fig. 1 of the drawings the row lines when stretched will, under the action of the spring 5, exert a tension upon the row line in line with the stake. If the main arm is turned at right angles to the stake, as illustrated in Fig. 2, a tension, when the planter is returning toward the anchor, will be exerted upon the row line at a distance from the stake equal to the length of the main arm which is, in practice, the distance required between the rows.

What I claim is—

1. The combination with a stake, of a spring-actuated arm revoluble thereon adapted to be operatively connected with a row line, substantially as set forth.

2. The combination with a stake, of a spring-actuated revoluble arm, and a stop piece secured to the stake adapted to limit the rotary movement of the arm, substantially as specified.

3. The combination with a stake, of a spring-actuated revoluble longitudinally movable arm, a stop piece provided with two projecting ends of unequal height secured to the stake, substantially as and for the purpose specified.

4. The combination with a stake, of a spring-actuated main arm, and a spring-actuated grasp arm revolubly secured to the end of the main arm, substantially as set forth.

5. The combination with a stake and spring-actuated revoluble main arm and stop piece, of a spring-actuated grasp arm secured to the end of the main arm, substantially as specified.

6. The combination with a stake, of a spring-actuated main arm, and oppositely spring-actuated grasp arm secured to the end of the main arm, substantially as specified.

In testimony of all which I have hereunto subscribed my name.

JOHN ALBERT WHITSON.

Witnesses:
J. H. HERNDON,
B. E. NUNCE.